US009088358B1

(12) United States Patent
Cloonan et al.

(10) Patent No.: US 9,088,358 B1
(45) Date of Patent: Jul. 21, 2015

(54) OBI DETECTION AND AVOIDANCE IN BROADBAND DEVICES

(75) Inventors: Thomas J. Cloonan, Lisle, IL (US); Gregory J. Gohman, Beaverton, OR (US)

(73) Assignee: ARRIS Enterprises, Inc., Suwanee, GA (US)

(*) Notice: Subject to any disclaimer, the term of this patent is extended or adjusted under 35 U.S.C. 154(b) by 343 days.

(21) Appl. No.: 13/452,202

(22) Filed: Apr. 20, 2012

Related U.S. Application Data (60) Provisional application No. 61/477,352, filed on Apr. 20, 2011, provisional application No. 61/477,222, filed on Apr. 20, 2011.

(51) Int. Cl.
  *H04B 10/00* (2013.01)
  *H04J 14/00* (2006.01)
  *H04J 14/02* (2006.01)
  *H04B 10/114* (2013.01)

(52) U.S. Cl.
  CPC ......... *H04B 10/1143* (2013.01); *H04J 14/0282* (2013.01)

(58) Field of Classification Search
  CPC ........ H04B 10/24; H04B 10/13; H04B 10/06; H04L 12/2801; H04L 7/0008; H04L 12/2856; H04L 12/2861; H04L 12/2865; H04L 43/0817
  USPC .......... 398/25, 66, 99, 89, 78, 43, 115, 67, 79
  See application file for complete search history.

(56) References Cited

U.S. PATENT DOCUMENTS

| 7,549,156 | B2* | 6/2009 | Li et al. ................... 725/111 |
| 7,865,727 | B2* | 1/2011 | Zeng et al. ................ 713/168 |
| 8,201,207 | B2* | 6/2012 | An et al. ................... 725/111 |
| 8,265,484 | B2* | 9/2012 | Boyd et al. ................. 398/74 |
| 8,428,465 | B2* | 4/2013 | Biegert et al. ............. 398/116 |
| 8,433,195 | B2* | 4/2013 | Biegert et al. .............. 398/72 |
| 8,477,807 | B1* | 7/2013 | Winters .................... 370/485 |
| 8,630,546 | B2* | 1/2014 | Bernard et al. ............ 398/154 |
| 8,798,470 | B2* | 8/2014 | Boyd et al. ................. 398/72 |
| 8,837,953 | B2* | 9/2014 | Mutalik et al. ............ 398/143 |
| 2004/0008683 | A1* | 1/2004 | Cloonan et al. ........... 370/395.4 |
| 2005/0076385 | A1* | 4/2005 | Li et al. ................... 725/111 |
| 2005/0246754 | A1* | 11/2005 | Desai et al. .............. 725/118 |
| 2006/0093356 | A1* | 5/2006 | Vereen et al. ............. 398/33 |
| 2006/0133805 | A1* | 6/2006 | Jang et al. ............... 398/26 |
| 2009/0092394 | A1* | 4/2009 | Wei et al. ................. 398/79 |
| 2010/0083330 | A1* | 4/2010 | Bernstein et al. ......... 725/111 |
| 2010/0104287 | A1* | 4/2010 | Biegert et al. ............. 398/67 |
| 2010/0154017 | A1* | 6/2010 | An et al. ................. 725/111 |
| 2010/0220994 | A1* | 9/2010 | Pradzynski et al. ......... 398/1 |
| 2010/0239251 | A1* | 9/2010 | Biegert et al. ............. 398/58 |

(Continued)

*Primary Examiner* — Ken Vanderpuye
*Assistant Examiner* — Abbas H Alagheband
(74) *Attorney, Agent, or Firm* — Troy A. Van Aacken (57) ABSTRACT

Systems and methods can operate to detect and avoid optical beat interference (OBI) in broadband devices by use of restrictive channel assignment. An OBI-mitigating mapper algorithm can leash OBI candidates in a circular queue to avoid scheduling service flows likely to result in OBI generation. In some implementations, the algorithm can automatically leash all pre-DOCSIS 3.0 service flows. In alternative implementations, the algorithm can allow the CMTS to normally load balance pre-DOCSIS 3.0 devices while manually adding and/or removing pre-DOCSIS 3.0 service flows from the OBI candidate queue based upon lost transmissions or a designated age-out timer.

7 Claims, 8 Drawing Sheets

(56) References Cited

U.S. PATENT DOCUMENTS

| | | | |
|---|---|---|---|
| 2010/0254708 A1* | 10/2010 | Pradzynski et al. | 398/98 |
| 2010/0272447 A1* | 10/2010 | Kolze et al. | 398/192 |
| 2011/0033189 A1* | 2/2011 | Biegert et al. | 398/115 |
| 2011/0142447 A1* | 6/2011 | Boyd et al. | 398/58 |
| 2012/0275792 A1* | 11/2012 | Nandiraju et al. | 398/66 |
| 2012/0308237 A1* | 12/2012 | Mutalik et al. | 398/116 |
| 2014/0348511 A1* | 11/2014 | Mutalik et al. | 398/136 |

* cited by examiner

OBI DETECTION AND AVOIDANCE IN BROADBAND DEVICES

CROSS REFERENCE TO RELATED APPLICATION

This application is a non-provisional of, and claims the benefit of U.S. Provisional Application Ser. No. 61/477,352, entitled "CMTS MAPPER to Mitigate RFOG OBI Issues," filed on Apr. 20, 2011, and is also a non-provisional of, and claims the benefit of U.S. Provisional Application Ser. No. 61/477,222, entitled "CMTS MAPPER Proposal to Mitigate RFOG OBI Issues," filed on Apr. 20, 2011, both of which are hereby incorporated herein by reference in their entirety.

TECHNICAL FIELD

This disclosure relates to interference detection and avoidance for transmissions of broadband devices.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use CATV network infrastructure for carrying voice, video on demand (VoD) and video conferencing traffic signals, among other types.

In addition to the MSO providing services over a hybrid fiber-coax (HFC) network, services may also be provided through a radio frequency over glass (RFoG) network, which generally includes a topology that can allow for an MSO to provide for a fiber architecture from the headend to a field node at a user's location (the field node may also be referred to as an optical network unit (ONU)). When more than one ONU in an RFoG network transmits upstream at any one time, transmission interference issues such as, for example, optical beat interference (OBI) can arise.

OBI can occur when one or more RFoG ONUs transmit contemporaneously to the same receiver, and contain wavelengths which are sufficiently close to each other. Moreover, OBI can be the result of the heterodyning of the two (or more) closely spaced wavelengths present on the same detector. Heterodyning results in the mixing products of the optical frequencies of two or more lasers appearing as wideband noise in the RF domain. The resulting noise can impact the signal integrity, thereby adversely affecting upstream transmissions. However, various systems and methods can be implemented in a cable modem termination system (CMTS) to aid in reducing transmission interference in an RFoG network. Such systems and methods seek to accomplish reducing OBI while utilizing state information readily available to the CMTS thereby reducing unnecessary complexity to existing systems.

BRIEF DESCRIPTION OF THE DRAWINGS

Like reference numbers and designations in the various drawings indicate like elements.

DETAILED DESCRIPTION

In some implementations of this disclosure, systems and methods can operate to detect and avoid OBI in broadband devices. The CMTS managing the modems within the RFOG network must be capable of determining which service flows are likely to be associated with modems that are currently experiencing OBI. Those service flows will be designated as OBI candidates. This means of determining the OBI candidates can be based on various sampled measurements of the service flow, looking at FEC error rates or uncorrectable FEC error rates or packet error rates. Service flows with an inordinately high error rate that exceeds certain pre-defined thresholds would be designated as OBI candidates. An OBI-mitigating mapper can leash those particular service flows that are OBI candidates to a specially-designated TDMA or ATDMA channel (called the "Leash channel."). In some implementations, a process for detecting and avoiding OBI can also automatically leash all pre-DOCSIS 3.0 service flows to the leash channel as well. In other implementations, the algorithm can elect to transmit packets from a service flow that is an OBI candidate across all channels, which can be done as long as the packet has been fragmented and is the only OBI candidate packet being transmitted across the channels in a given time-slot.

In some implementations, an upstream service group can be defined as one or more upstream channels that are accessible to a particular pool of subscribers. In many cases, an upstream service group will have more than one channel. These multiple upstream channels within an upstream service group can be used by modems in both a channel bonded fashion (passing packets or fragments of packets for a service flow across multiple upstream channels) or in a non-bonded fashion (passing packets or fragments of packets for a service flow on only one upstream channel). In a typical RFOG environment, the CMTS schedules the requested transmissions using an upstream mapper that schedules the cable modems' upstream transmissions which are intercepted by an optical networking unit (ONU), which converts the upstream transmissions from the electrical domain into the optical domain. If the area serviced by the CMTS has more than one upstream channel assigned to it, then the scheduled transmissions can be mapped onto multiple RF upstream channels, and it is possible that two or more cable modems can be transmitting on different channels at the same time. It would be understood by one familiar with the DOCSIS technology that cable modems exist as stand-alone devices, and are also integrated into other devices such as settop boxes, media gateways, and embedded media terminal adapters (EMTAs). The references to cable modems should be taken to refer to stand-alone cable modems as well as any devices incorporating an embedded cable modem.

Similarly, if the area serviced by the CMTS has SCDMA channels assigned to it, then the scheduled transmissions can be mapped on multiple spreading codes, and it is possible that two or more cable modems or eMTAs can be transmitting on different spreading codes at the same time. Thus, the mapper allocates to one or more users the timeslots allocated for upstream transmission. During the times when simultaneous transmissions are occurring, it is possible for OBI issues to develop, which would tend to corrupt the data being sent by the transmitting devices. As a result, transmission loss can occur due to OBI issues.

To mitigate these OBI issues, the CMTS can select one TDMA or ATMA upstream channel within the RFoG-enabled upstream service group as a "leash" upstream channel. In some implementations, the CMTS can select the TDMA or ATDMA channel with the lowest-numbered upstream channel ID (UCID) as the leash upstream channel within an upstream service group. Other mechanisms for selecting the leash channel are also permissible. It should be understood that any upstream channel that is not the leash upstream channel can be considered a "non-leash" upstream channel within that upstream service group. There are three basic parts to the Restrictive Channel Assignment methods in this disclosure: identification of OBI suspects, restrictive channel assignment to reduce the likelihood of OBI, controlled release of devices from restrictive channel assignment.

To identify OBI suspects, the CMTS must identify all service flows that are associated with modems that are suspected of experiencing OBI issues. These service flows are known as OBI candidates. They are called OBI candidates, because the CMTS can never by certain that their associated modems are actually experiencing OBI issues; however, the CMTS can make an intelligent guess that this is the case. The goal was to make this OBI candidate identification process as simple as possible to reduce software complexity. Two possible methods for the first idea are described herein.

In the first method of the first idea, the CMTS would determine which service flows are experiencing higher-than-usual uncorrectable FEC codeword error rates. One way to do this is to define a fixed interval of time (called the OBI sample time). Modem service flows that have displayed an abnormally high percentage of uncorrectable FEC codeword errors (calculated by dividing the number of uncorrectable FEC codeword errors by the total number of codewords transmitted or by the total number of correct codewords transmitted) can be identified as "OBI-candidates." It should be noted that all of the above codeword-oriented counts are readily available for every service flow in the CMTS, which makes this approach fairly simple to implement. It should also be noted that some service flows may be incorrectly identified as being OBI-candidates when their problems might have been caused by other issues, but these cases should be rare. In addition, it should be noted that although OBI events tend to cause losses on all service flows that are transmitting whenever the OBI event occurs (even service flows that did not cause the OBI event), the two service flows that actually created the OBI event will always be transmitting whenever their OBI event occurs, so their error counts will undoubtedly be much higher than those of other service flows that were randomly transmitting during some of the OBI events. As result, this particular approach identifies devices whose errors trend higher than the other devices in the same upstream service group.

In another implementation of the OBI candidate list determination, a further processing step for determining the OBI candidate list can be used. Such step(s) can be added to achieve some improved scheduling efficiencies within the mapper algorithm. In particular, this augmentation would involve the CMTS identifying pairs or groups of service flows that seem to be showing OBI issues at the same time. As a result, pairs of suspiciously-acting devices or their associated service flows can be added to the OBI candidate list. This includes detailed information regarding the moment in time when the OBI issues (massive packet loss) occurred. If two service flows (A, B) from two devices were being transmitted on the upstream channels of the service group when massive packet loss occurred on all channels (a likely OBI signature), then the pair of service flows (A, B) or devices would be placed into the OBI candidate list. If three service flows (C, D, E) from two or more devices were being transmitted on the upstream channels within the service group when massive packet loss occurred on all channels (a likely OBI signature), then the service flow pairs (C,D), (C,E), and (D,E) or their associated device pairs would be added to the OBI candidate list. In general, if N service flows were being transmitted on the upstream channels within the service group when massive packet loss occurred on all channels, then there would be N times (N−1) divided by two new pairs that would be added to the OBI candidate list. Then, when using the OBI candidate list, the restrictive channel assignment algorithm would only have to preclude the listed pairs of service flows or devices from transmitting at the same time.

Once the CMTS has identified all of the service flows (or pairs of service flows) that are OBI candidates, the restrictive channel assignment algorithm can take place. This second stage involves the CMTS preventing two or more of these OBI candidates from transmitting at the same time. It can be permissible for other service flows from other devices (that are not OBI candidates) to be transmitted at the same. It is also permissible for a single OBI candidate to be transmitted at the same time as other service flows that are not OBI candidates. But two or more OBI candidates cannot be transmitted at the same time. There are many possible implementations to accomplish this second goal. Two possible implementations are described below.

The first implementation for the restrictive channel assignment works with the single service flows or devices (not pairs) on the OBI candidate list. This implementation works to provide that OBI candidates are transmitted on a particular TDMA or ATDMA upstream channel within the service group. This specially-designated TDMA or ATDMA channel is called the "leash channel." By instructing transmissions for OBI candidates to occur on that leash channel, it should be apparent to those familiar with DOCSIS that it is impossible for two service flows or devices that are OBI candidates to be scheduled for transmission at the same time. A timeslot can be defined as the period of time available for contemporaneous transmissions across the service group. Within a given timeslot, the mapper can schedule at most one OBI candidate transmission on the leash channel. If it does not schedule an OBI candidate transmission on the leash channel within a given time-slot, then it is permissible for the mapper to schedule a service flow from a device not on the OBI candidate list onto the leash channel during that particular time-slot. All of the non-leash channels can be mapped to other service flows that are not OBI candidates, but the non-leash channels should not transport packets associated with an OBI candidate service flow. Thus, in any particular time-slot, the mapper can create a scenario where one OBI candidate is on the leash channel and non-OBI candidates are on the non-lease channels; or the mapper can create a scenario where non-OBI candidates are on all of the channels. The mapper in the CMTS continues from time-slot to time-slot in this fashion.

Although not required, a potential augmentation to this implementation provides that the CMTS also determine the DOCSIS version of the cable modems. In some implementations, the determination can be made by examining Initial maintenance and registration MAC management messages. Once the modem versions have been identified, the CMTS can automatically leash service flows associated with pre-DOCSIS 3.0 modems to the leash upstream channel. This augmentation can be beneficial to subscriber Quality of Experience (QoE) levels, because moving pre-DOCSIS 3.0 modems between channels (using DCC protocol messages) can take much longer than moving DOCSIS 3.0 modems between channels (using DBC protocol messages or simple channel bonded packet steering). In alternative implementations, the algorithm can allow the CMTS to normally load balance pre-DOCSIS 3.0 service flows while the restrictive channel assignment algorithm acts to add and/or remove pre-DOCSIS 3.0 service flows from the OBI candidate queue based upon lost transmissions or a designated age-out timer. This approach would involve the use of DCCs for the pre-DOCSIS 3.0 service flows.

Another implementation of the restrictive channel assignment algorithm can work with OBI candidate lists containing single service flows or devices, and it can work with OBI candidate lists containing pairs of service flows or devices. This implementation acts to check the OBI candidate list and never allow the mapper in the CMTS to schedule transmissions that overlap in time if the transmissions are associated with two service flows or devices that are implicated within the OBI candidate list. This second method is more computationally complex, as it involves many cross-checks through the OBI candidate list whenever a new transmission opportunity is granted. This provides that two implicated service flows or devices within the OBI candidate list are not mapped onto different channels or different SCDMA spreading codes at the same instant in time.

Once service flows or devices have been placed on the OBI candidate list, there can be an algorithm called upon to determine how long the service flows should remain in the OBI candidate list. In time, OBI issues between two transmitters can disappear as laser temperatures can fluctuate and cause a shift in laser wavelengths. As a result, a technique is required to eventually move service flows out of the OBI candidate list to see if they can be returned to operation using the "normal" operating mode again. In other words, service flows must be periodically "aged out" of the OBI candidate list. Several different methods can be considered for accomplishing this aging process that is associated with the third idea. Several possible implementations are described below, but this list is not meant to be all-inclusive:

Keeping a global timing counter and simply moving all of the OBI-Candidates off of the list every X seconds. Note that depending on when each OBI-Candidate was placed on the list, each OBI-Candidate may experience different amounts of time on the OBI-Candidate list.

Keeping a timing counter on each OBI-Candidate and moving a particular OBI-Candidate off of the list when it has been on the list for X seconds.

Keeping a timing counter on each OBI-Candidate and moving a particular OBI-Candidate off of the list when the OBI-Candidate has been on the list without experiencing any OBI issues (large error counts) for the past X seconds.

Having a fixed-size circular queue of size Z that adds exactly Y new OBI-Candidates every X seconds. Candidates that have been on the list without all will begin to over-write OBI-Candidates added earlier to the circular queue has been on the list without all will begin to over-write OBI-Candidates added earlier.

Having a fixed-size circular queue of size Z that adds all newly-identified OBI-Candidates, OBI-Candidates will eventually be removed from the OBI-Candidate list as the older entries are overwritten.

Combinations of the above.

It should be understood that various algorithms and methods can be used to ensure fairness in upstream transmission priority over time (i.e., no single service flow consistently gets unwarranted priority over another within an OBI Candidate list).

Figure 1:
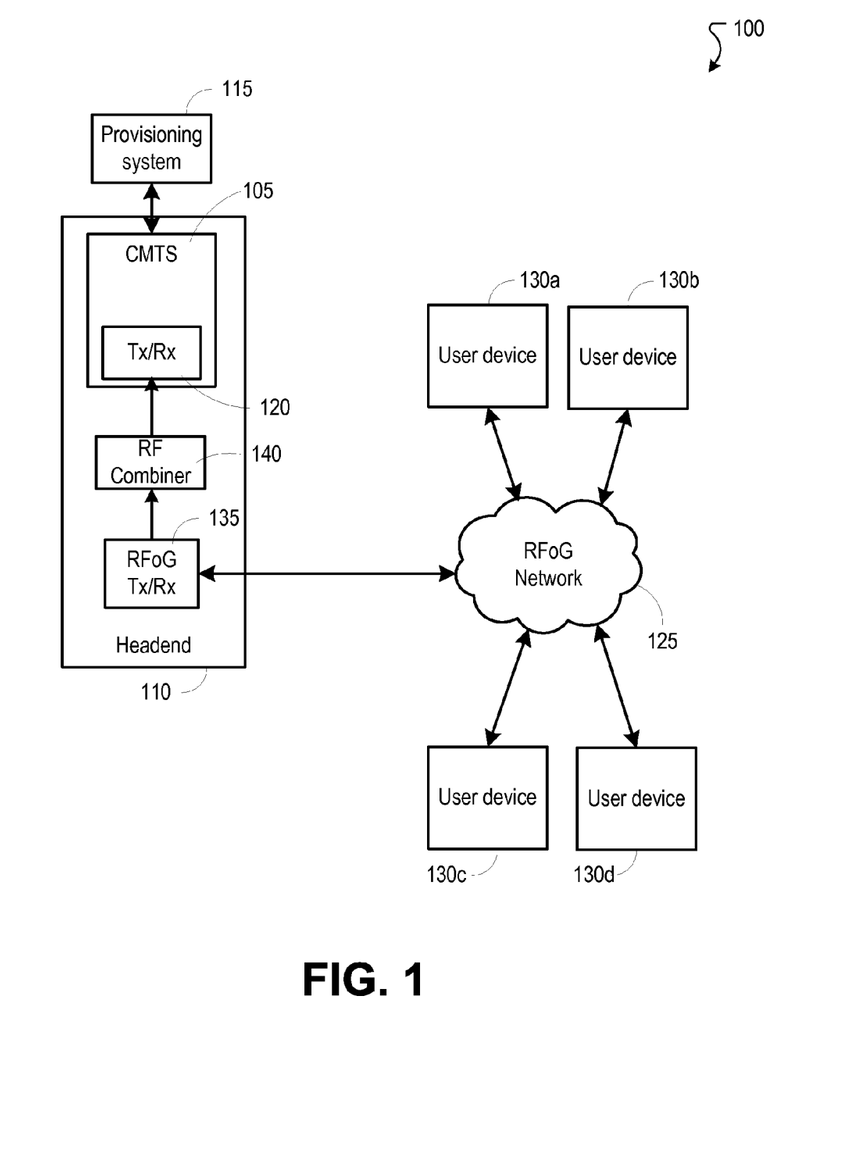
FIG. 1 is a block diagram illustrating an example network environment showing an RFoG network coupled to a headend operable to provide OBI detection and avoidance using Restrictive Channel Assignment.

FIG. 1 is a block diagram illustrating an example network environment showing an RFoG network coupled to a headend operable to provide OBI detection and avoidance using restrictive channel assignment. An example network environment 100 can include a cable modem termination system (CMTS) 105 located at a headend 110 of a multiple service operator (MSO), such as a cable company. The environment can also include a provisioning system 115 operable of communicating with one or more CMTSs. In some implementations, a headend 110 can provide video, data and voice services to a subscriber. The CMTS 105 can include a processor, a memory, and a storage device. It may also have one or more transmitters/receivers 120 for transmitting/receiving signals through one or more networks. The transmitters/receivers 120 can be one or more separate transmitter and receiver components residing on the same board, or separate boards; further, the transmitter and receiver can also include various subcomponents, such as modulators and demodulators.

The CMTS 105 can also receive data signals from user devices, such as cable modems 130a-d, EMTAs, and/or set top boxes, through one or more networks, including an RFoG network 125 or other HFC networks. The combination of optical fibers and coaxial cable operate to send data to and receive data from the headend 110. The RFoG network 125 can be bi-directional, wherein signals are carried in both directions on the same network from the headend 110 to the user devices 130a-d, and from the user devices 130a-d to the headend 110. The downstream signals, which can also be referred to as forward-path signals, carry information from the headend 110 to the home such as video content, voice, and internet data. The upstream signals, which may also be referred to as return-path signals, carry information from user devices 130a-d to the headend 110, such as control signals to order a movie, or internet data such as email.

The various signals from the headend 110 may be encoded, modulated, and/or upconverted onto RF carriers, combined onto an electrical signal, and inserted into a broadband optical transmitter. The broadband optical transmitter can be operable to convert the electrical signal to a downstream optically modulated signal that is sent to one or more fiber optic nodes. An example fiber optic node has a broadband optical receiver, which converts the downstream optically modulated signal into an electrical signal operable to propagate through co-axial cables to end user devices 130a-d.

The downstream electrical signal can be a radio frequency (RF) modulated signal. The forward-path and the return-path can be carried over the same coaxial cable in both directions between the optical node and the end user devices. Typically, requests for upstream bandwidth are made by the user devices 130a-d. The CMTS 105 may grant or deny such requests. In some implementations, the CMTS 105 can generate one or more transmission maps (e.g., upstream mapper) that allocate to user devices 130a-d a specific time slot and frequency at which the user devices 130a-d may transmit.

The transmission maps can be generated using, for example, DOCSIS 3.0's enhanced concatenation and fragmentation algorithm, or any other suitable algorithm. The provisioning system can be operable to communicate with one or more CMTSs. Among other functions, a provisioning system 115 can include software that can be used to get user devices 130a-d ready to exchange data, including activating the CMTS (or other appropriate server such as a DHCP server) to dynamically assign IP addresses to user devices 130a-d. Upstream transmissions from the user devices 130a-d can pass through the RFoG network 125 and be received by an RFoG receiver 135 at the headend. Signals from the RFoG network 125 may then be combined with one or more RF signals coming from other HFC networks, or from other RFoG networks using an RF combiner 140.

Figure 2:
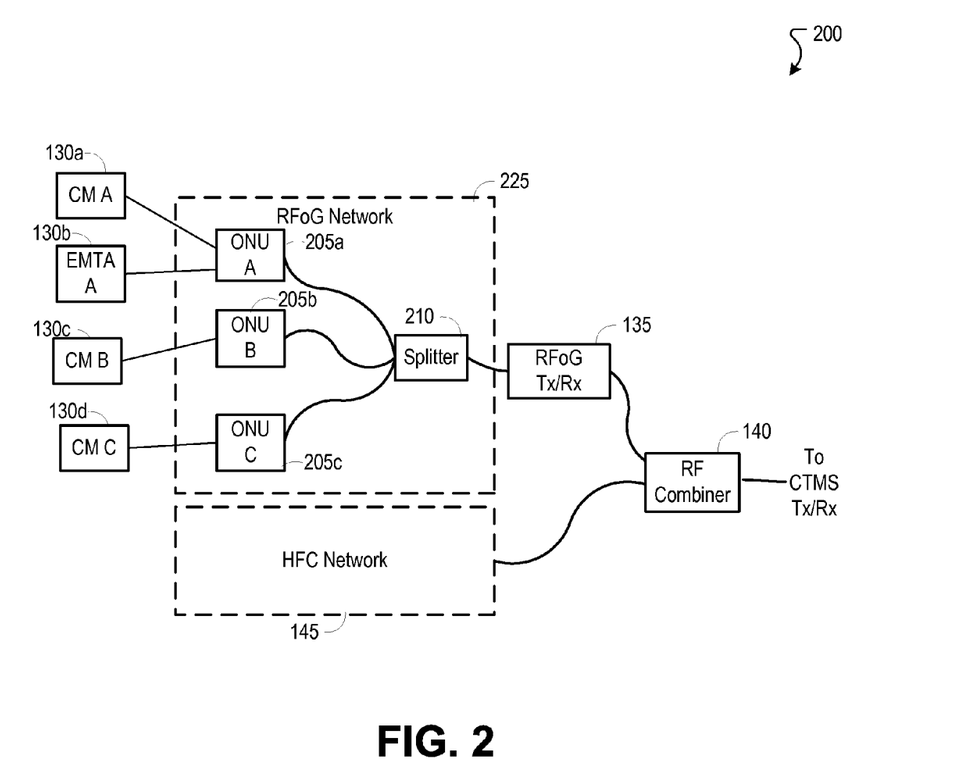
FIG. 2 is a block diagram illustrating example components of an RFoG network operable to provide OBI detection and avoidance using Restrictive Channel Assignment.

FIG. 2 is a block diagram illustrating example components of an RFoG network operable to provide OBI detection and avoidance using restrictive channel assignment. The diagram illustrates an example radio frequency over glass (RFoG) network 125 that is deployed with an existing HFC network 145. An RFoG topology includes an all-fiber service from the headend (e.g., headend 110 of FIG. 1) to a field node, or optical network unit (ONU) 205a-c, which is typically located at or near the user's premises. In some implementations, the RFoG Tx/Rx 135 can be connected to an optical splitter 210. Typically coaxial interfaces can be used to connect the ONUs 205a-c of an RFoG network to one or more user devices 130a-d, wherein the RFoG user devices 130a-d can include cable modems, EMTAs, or set-top boxes, as with the user devices of an HFC network. In the headend, a downstream laser sends a broadcast signal that is optically split multiple times. The optical network unit, or ONU, recovers the RF broadcast signal and passes it into the subscriber's coax network.

In various implementations, the RFoG transmitter/receiver 135 may be one or more separate transmitter and receiver components residing on the same board, or alternatively separate boards; further, the transmitter and receiver may also include various sub-components, such as modulators and demodulators. The RFoG transmitter/receiver 135 receives the optically modulated signals on optical channels and demodulates the signals into the electrical signals, which may be RF signals. Signals from the RFoG network 125 can then be combined with one or more RF signals coming from other HFC networks such as HFC network 145, or from other RFoG networks using an RF combiner 140, before being received by the CMTS transmitter/receiver (e.g., CMTS transmitter/receiver 130 of FIG. 1). The connections illustrated in FIG. 2 between the RFoG network 125 and the HFC network 145 and the CMTS transmitter/receiver show an upstream transmission only for example purposes.

Figure 3:
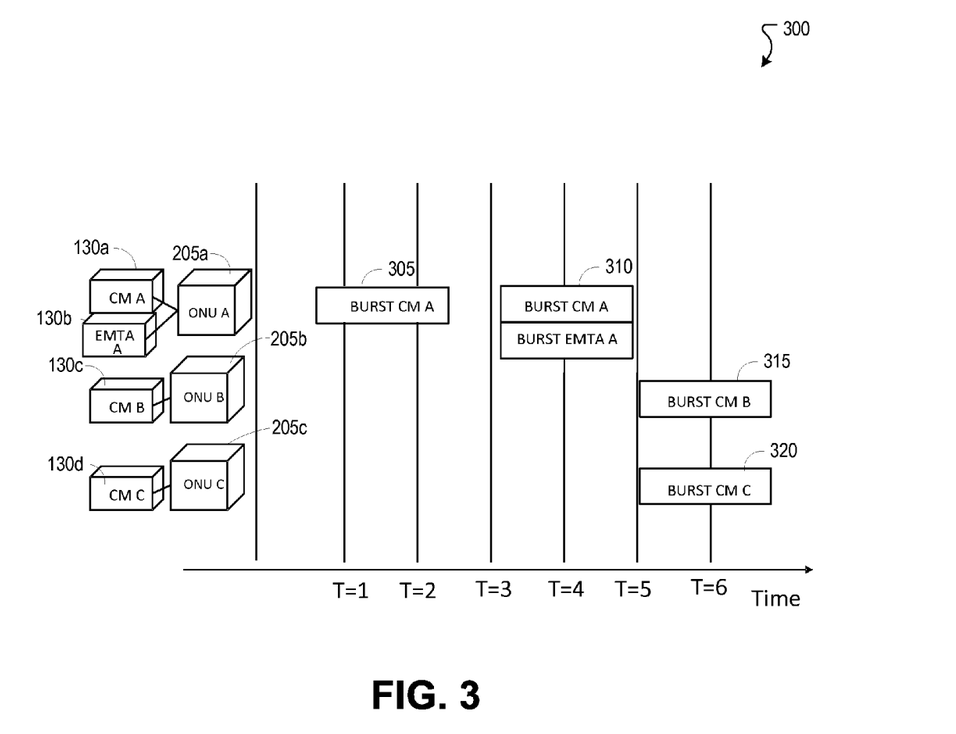
FIG. 3 is a diagram illustrating examples of transmissions of user devices in an RFoG network operable to provide OBI detection and avoidance using Restrictive Channel Assignment.

FIG. 3 is a diagram illustrating examples of transmissions of user devices in an RFoG network operable to provide OBI detection and avoidance using restrictive channel assignment. FIG. 3 illustrates components that may be part of the example RFoG network (e.g., RFoG network 125 of FIG. 1) during an OBI scenario. User devices 130a-d may be connected to an RFoG network, wherein the RFoG network may include one or more ONUs 205a-c. In the example shown, user device 130a may be a cable modem A (CM A), 130b user device may be an EMTA (EMTA A), wherein both CM A 130a and EMTA A 130b are connected to the same ONU (e.g., ONU A 205a). In this example, user device 130c can be a cable modem (CM B) and connected to ONU B 205b, and user device 130d may be a cable modem (CM C) connected to ONU C 205c.

The user devices 130a-d can transmit RF signals to their respective ONUs 205a-c. The ONUs 205a-c can modulate the upstream RF traffic onto optical channels and send those signals to the optical splitter, which then passes on the signals on the optical channels to the RFoG transmitter/receiver, which may be located at the headend. The RFoG transmitter/receiver 225 recovers the RF signals from the optical channels via demodulation. The RF signals can then be sent to an RF combiner, where the RF signals may be combined with other RF signals from other RFoG or HFC networks. One consideration in the upstream, however, is that more than one ONU transmitting at a time can cause interferometric beat noise, a condition which can be referred to as OBI. This condition can result in the contemporaneous transmission of multiple devices being lost. Systematic studies of OBI have not been generally released, but the severity of OBI has been found to correlate to the frequency spread of the transmitting lasers, and also may result from architectural factors and device factors.

OBI is avoided when only one burst is scheduled within a given channel. For example, Burst CM A 305 is the only scheduled burst at T=1, thereby avoiding the potential for OBI. In another example, Burst CM A and Burst EMTA A 310 are transmitted at T=4 in which both user devices are transmitting to the same ONU of the RFoG network 125, whereby the ONU will receive the RF transmissions and modulate those RF signals onto an optical channel and send out one transmission burst, avoiding OBI. Such cases of contemporaneous transmissions that cannot result in OBI also include implementations in which user devices are on separate RFoG networks. In still another example, at T=6, Burst CM B 315 and Burst CM C 320 are transmitted contemporaneously. In this instance, of the transmitting devices are connected to different ONUs and is thereby vulnerable to OBI.

Figure 4:
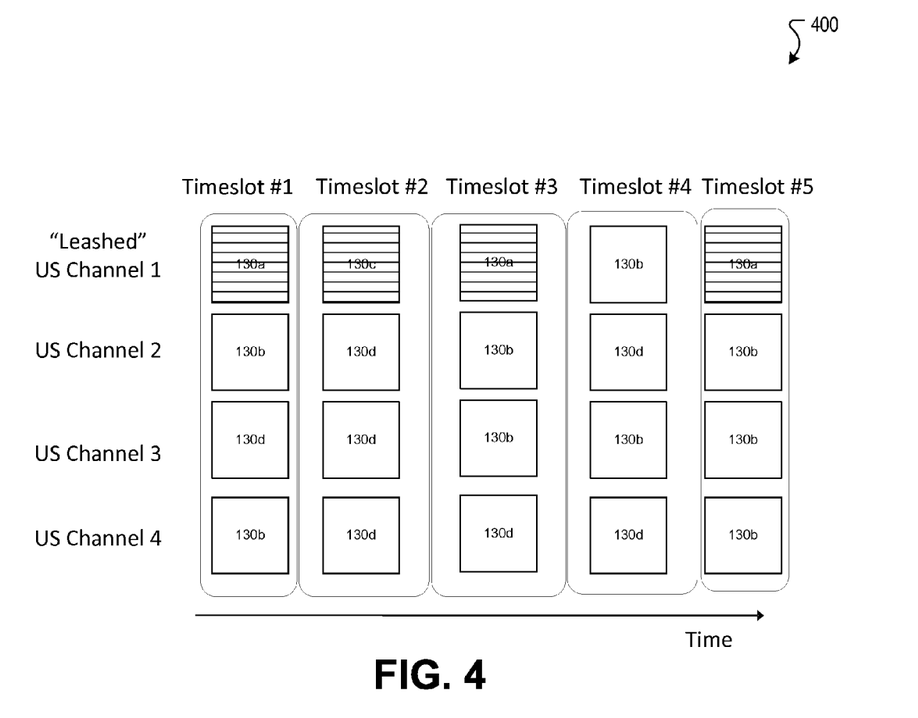
FIG. 4 is a diagram illustrating an example transmission map wherein user devices exist on an RFoG network operable to provide OBI detection and avoidance using upstream channel leashing.

FIG. 4 is a diagram illustrating an example transmission map wherein user devices exist on an RFoG network operable to provide OBI detection and avoidance using upstream channel leashing. The example transmission map 400 having four upstream channels, and one or more time slots (also referred to as burst frames) for each frequency, wherein the user devices 130a-d are cable modems coupled to an RFoG network 125. While four devices and four channels are shown for illustrative purposes, more channels, more user devices, and more than one RFoG network and/or HFC networks may be employed. In this example, US Channel #1 is designated as the Leashed Channel.

The transmission map 400 was created assuming that device 130a and 130c are currently on the OBI Candidate list. The mapper can therefore allocate channels to the modems using the following rules. Devices 130a and 130c can only be scheduled by the mapper on the Leash channel, Channel #1 in this example. Transmissions from devices 130a and 130c are shown with a hatched marking. Devices 130b and 130d can be scheduled by the mapper on any of the four Channels, including the Leash channel.

Figure 5:
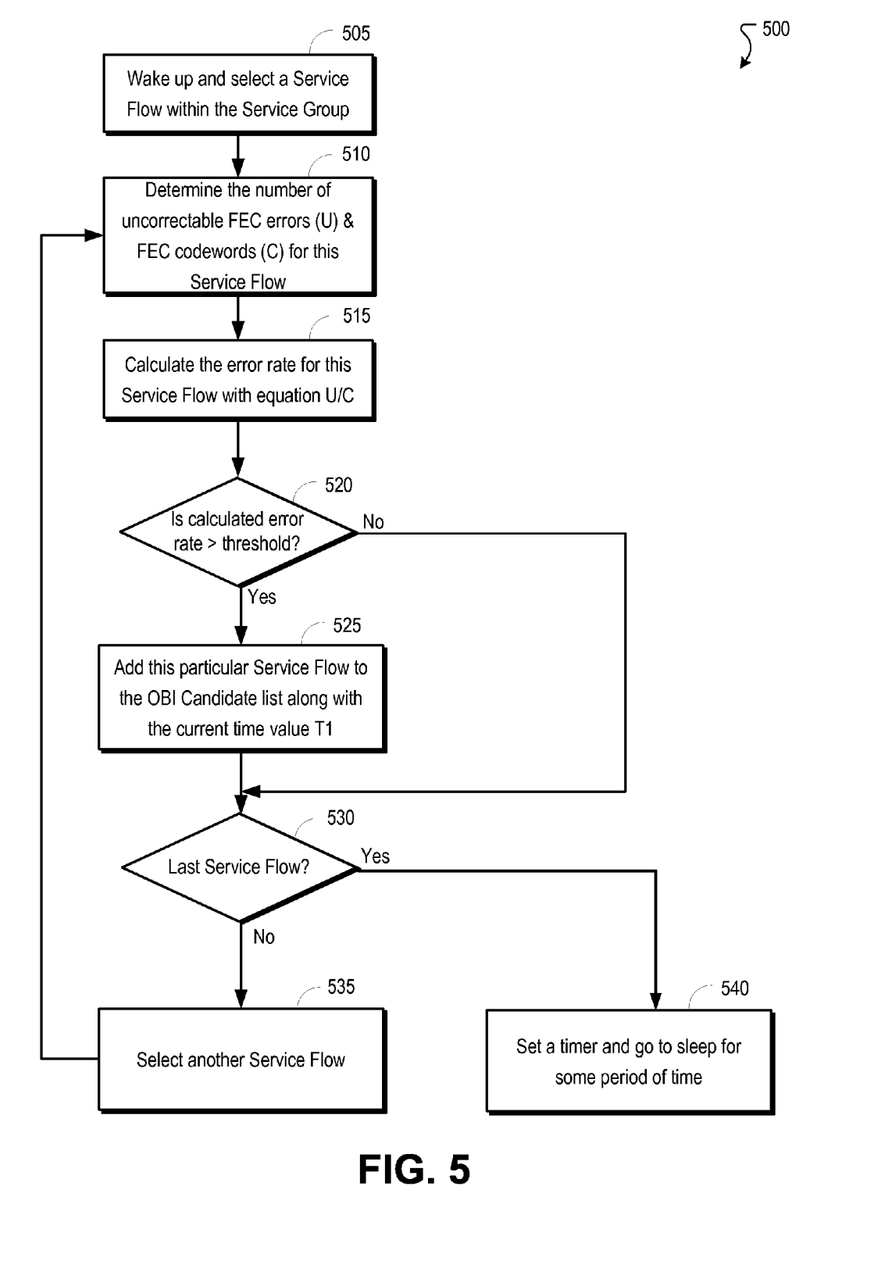
FIG. 5 is a flow diagram illustrating an example OBI Candidate detection process that can be performed by a CMTS operable to provide OBI detection and avoidance using upstream channel leashing.

FIG. 5 is a flow diagram illustrating an example OBI candidate detection process that can be performed by a CMTS operable to provide OBI detection and avoidance using upstream channel leashing. The process 500 begins at stage 505 when the CMTS OBI candidate detection process wakes up after a pre-specified sleep time (which could last for, as an example, several seconds). The sleep time permits service flow error counters to be filled with samples from recent data transmissions from each of the active service flows. A first service flow is selected for initial processing within the newly-awoken process. At stage 510, the CMTS (CMTS 105 of FIG. 1) determines the number of uncorrectable FEC errors and codeword errors that have passed by during its previous sleep time.

At stage 515, the CMTS (CMTS 105 of FIG. 1) calculates the current error rate for this service flow by dividing the number of uncorrectable errors by the number of transmitted codewords. It should be noted that the calculations can also use long-term averages of these error rate samples to ascertain which service flows are OBI candidates.

At stage 520, a determination is made whether the service flow is to be added to the OBI candidate list. The determination can be made by the CMTS (CMTS 105 of FIG. 1). It accomplishes this by comparing the current error rate to a pre-specified threshold value. If the current error rate is greater than the pre-specified threshold, then the process continues to stage 525. If not, then the process continues to stage 530.

At stage 525, the currently selected service flow is added to the OBI candidate list, because its error rate was deemed to be inordinately high compared to the threshold defined in stage 520. In addition to adding the service flow (using, for example, a SID value or SID cluster list to uniquely identify the service flow within the service group), the process must also register the current time value T1 from a timer. The process then continues to stage 530.

At stage 530, a determination is made whether the current service flow being considered has either been added to the OBI candidate list or not. But the processing for the service flow is complete. As a result, a check is performed to see if this is the last of the service flows associated with the service group. If so, then the process progresses to stage 540. If not, then the process progresses to stage 535.

At stage 535, a yet-to-be-processed service flow is selected from the list of all service flows within the service group. The process then loops back to stage 510 to repeat the aforementioned processing steps on the new service flow.

At stage 540, all of the service flows within the service group have been processed, so the process sets a timer and goes back to sleep in preparation for a repeat of all of the aforementioned steps after the timer counts down for a pre-specified window of time.

Though the steps in the above flow make reference to service flows, the process is equally applicable to tracking devices.

Figure 6:
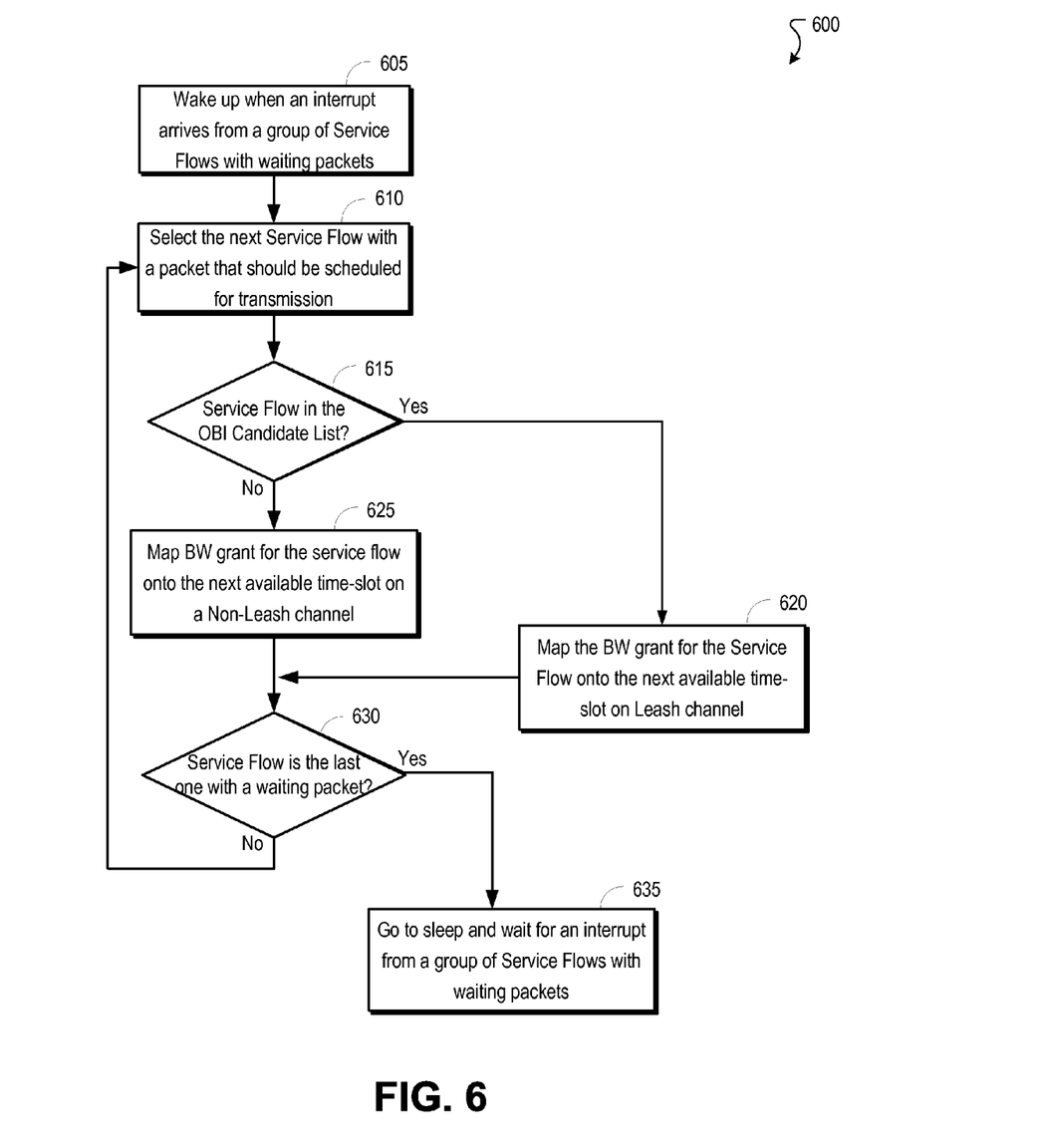
FIG. 6 is a flow diagram illustrating an example mapper process that can be performed by a CMTS operable to provide OBI detection and avoidance using upstream channel leashing.

FIG. 6 is a flow diagram illustrating an example mapper algorithm that can be performed by a CMTS operable to provide OBI detection and avoidance using upstream channel leashing. The process 600 begins at stage 605 when the mapper within the CMTS becomes cognizant of an interrupt indicating that one or more requests for bandwidth (Bandwidth Requests) have arrived. These requests for bandwidth are typically sent from a modem or eMTA to the CMTS using a DOCSIS bandwidth request MAC management message. Oftentimes, the mapper receives many of these DOCSIS Bandwidth Requests within a short time window and processes them in bulk.

At stage 610, the process determines which one of the many bandwidth requests to be processed has the highest precedence at the present moment. This bandwidth request priority determination algorithm can consider many factors, including the priority of the service flows associated with the bandwidth requests, the pre-configured throughput of the service flows associated with the bandwidth requests, and the recent bandwidth allocated to the service flows associated with the bandwidth requests. After considering all of these factors (and sometimes other factors as well), the mapper selects the single bandwidth request from a particular service flow that will be presently processed. The selected bandwidth request will now be scheduled or mapped into the maps that are continually created for each of the upstream channels within the service group. These maps associate a bandwidth grant for the particular service flow associated with the selected bandwidth request, and they basically specify a window of time on a particular upstream channel when a service flow's data can be transmitted by the modem. These maps are periodically sent down to all of the modems, and the bandwidth grants that they carry indicate when the modems can and should transmit their data packets on the various upstream channels that are accessible to each of the devices.

At stage 615, the CMTS (CMTS 105 of FIG. 1) determines whether the current service flow (associated with the selected bandwidth request being processed) is in the OBI candidate list. If it is, then the process progresses to stage 620. If it is not, then the process progresses to stage 625.

At stage 620, the mapper algorithm is working on a Bandwidth Request for a service flow that is on the OBI candidate list. Thus, the bandwidth grant that satisfies all (or a portion) of the currently-selected bandwidth request is assigned to the map for the leash channel within the service group. In particular, the mapper algorithm would typically assign the next available time-slot within the leash channel to the bandwidth grant which satisfies the terms of the bandwidth request.

At stage 625, the mapper algorithm is working on a bandwidth request for a service flow that is not on the OBI candidate list. Thus, the bandwidth grant that satisfies all (or a portion) of the currently-selected bandwidth request is assigned to a map associated with a non-leash channel or channels within the service group. In particular, the mapper algorithm would typically assign the next available time-slot(s) within the non-leash channels to the bandwidth grant which satisfies the currently-selected bandwidth request. It should be noted that it is also permissible for the mapper algorithm to assign the bandwidth grant of this service flow to the leash channel if it deems this assignment to be desirable.

At stage 630, the mapper algorithm determines whether the current service flow's bandwidth request is the last bandwidth request within the group of bandwidth requests that are being processed together. If so, then the process progresses to stage 635. If not, then the process loops back to stage 610 to begin processing the next service flow's bandwidth request.

At stage 635, the process goes to sleep and waits for a timer or interrupt from a group of service flows that have more bandwidth requests requiring bulk processing.

Figure 7:
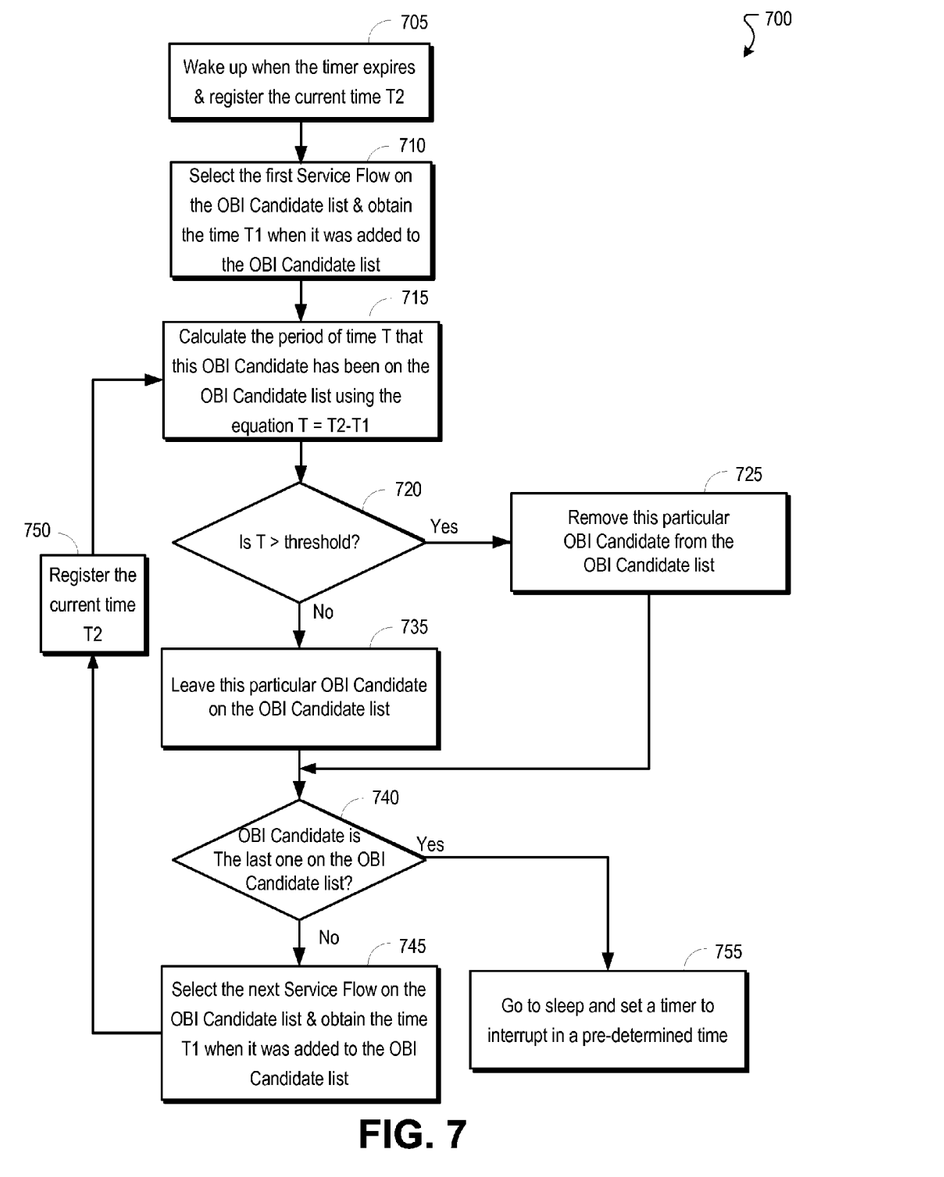
FIG. 7 is a flow diagram illustrating an example OBI Candidate release process that can be performed by a CMTS operable to provide OBI detection and avoidance using upstream channel leashing.

FIG. 7 is a flow diagram illustrating an example OBI candidate release process that can be performed by a CMTS operable to provide OBI detection and avoidance using upstream channel leashing. The process 700 begins at stage 705 when the CMTS OBI candidate release process wakes up after a pre-specified sleep time (which could last for, as an example, several minutes). The sleep time provides a sampling period that defines the rate at which the mapper algorithm must perform the OBI candidate release process. When the process wakes up, it should register the current time value T2 on a timer.

At stage 710, the process selects the first service flow within the OBI candidate list and retrieves the time value T1 that indicates when that particular service flow was added to the OBI candidate list. Recall that this value T1 was added into the OBI candidate list when this particular service flow was added to the OBI candidate list by stage 525 in the process shown in FIG. 5.

At stage 715, the period of time that this particular service flow has spent in the OBI candidate list is calculated. The calculation simply subtracts the time value T1 from the current time value of T2. The difference between the two time values is the period of time that this particular service flow has spent in the OBI candidate list. It should be noted that finite-sized counters may wrap around back to zero, so the calculations need to account for that fact.

At stage 720, the process determines whether the period of time that this particular service flow has spent in the OBI candidate list is longer than a pre-defined threshold (perhaps minutes). This threshold can be configured, and it should be selected to ensure that it is long enough to permit adequate time to pass in hopes that the original OBI issues that placed this particular service flow on the OBI candidate list have now subsided. These OBI issues can subside if, for example, the temperatures of the lasers have changed within threshold time, which would lead to a change in the laser wavelengths and potentially reduce the OBI effect. However, the threshold should not be selected to be too short, because that may cause the service flows to be bouncing back and forth between being on and off of the OBI candidate list too often. If the period of time that this particular service flow has spent on the OBI candidate list is longer than the threshold, then the process progresses to stage 725. If not, then the process progresses to stage 735.

At stage 725, the process removes the particular service flow from the OBI candidate list. This is done because the service flow has spent what is deemed to be adequate time on the OBI candidate list, and it is hoped that the OBI issues that caused it to be placed there have now subsided. This step restores the service flow to a state where the mapper will now treat it in a "normal fashion," because the service flow's bandwidth grants will no longer be restricted to only occur on the leash channel.

At stage 735, the process leaves the particular service flow on the OBI candidate list. This is done because the service flow has not yet spent adequate time on the OBI candidate list.

At stage 740, the process determines whether it has processed all of the service flows within the OBI candidate list. If so, then the process progresses to stage 755. If not, then the process progresses to stage 745.

At stage 745, the process still has service flows within the OBI candidate list that still require processing. It selects the next service flow from the OBI candidate list, and it also retrieves the time value T1 that indicates when that particular service flow was added to the OBI candidate list. Recall that this value T1 was added into the OBI candidate list when this particular service flow was added to the OBI candidate list by stage 525 in the process shown in FIG. 5. The process then continues on to stage 750.

At stage 750, the process samples the current time T2 from a timer. It then loops back to stage 715 and repeats that aforementioned processing steps for the new service flow.

At stage 755, all of the service flows within the OBI candidate list have been processed, so the process sets a timer and goes back to sleep in preparation for a repeat of all of the aforementioned steps after the timer counts down for a pre-specified window of time.

Figure 8:
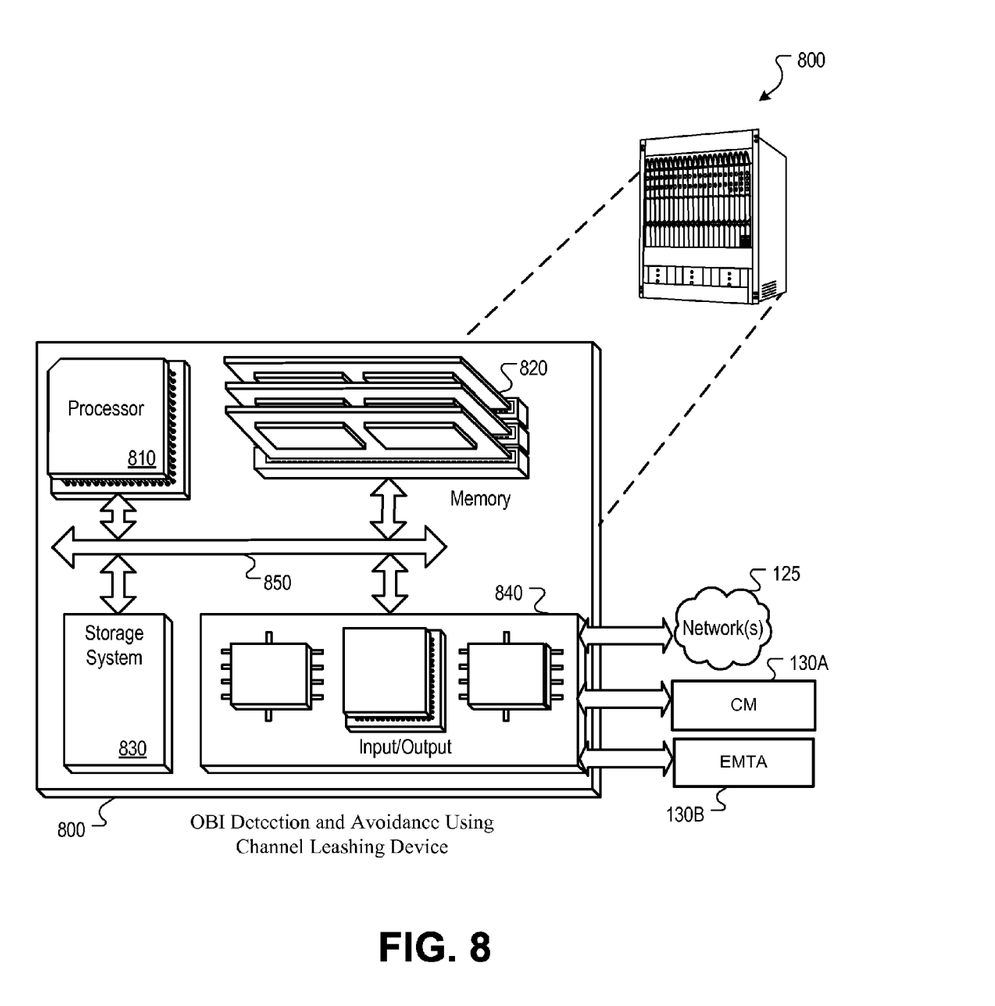
FIG. 8 is a block diagram illustrating an example CMTS operable to provide OBI detection and avoidance using upstream channel leashing.

FIG. 8 is a block diagram illustrating an example CMTS operable to provide OBI detection and avoidance using restrictive channel assignment. The broadband device (e.g., CMTS) 800 operable to provide OBI detection and avoidance using upstream channel leashing can include a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830. The processor 810 can be a complex of one or more processors.

The memory 820 stores information within the device 800. In one implementation, the memory 820 is a computer-readable medium. In one implementation, the memory 820 is a volatile memory unit. In another implementation, the memory 820 is a non-volatile memory unit.

In some implementations, the storage device 830 is capable of providing mass storage for the device 800. In one implementation, the storage device 830 is a computer-readable medium. In various different implementations, the storage device 830 can, for example, include a hard disk device, an optical disk device, flash memory or some other large capacity storage device.

The input/output device 840 provides input/output operations for the device 800. In one implementation, the input/output device 840 can include one or more of a wireless interface, network 125, cable modem 130*a* (e.g., cable modem 130*a* of FIG. 1), eMTA 130*b* (e.g., eMTA 130*b* of FIG. 1), such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a CM 130*a* and/or eMTA 130*b*), as well as sending communications to, and receiving communications from various networks.

The device (e.g., a CMTS) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing can be advantageous.

What is claimed is:

1. A method for scheduling the transmission of user devices on a radio frequency over glass (RFoG) network comprising:

determining whether a lost transmission event occurred with a first cable modem associated with a first optical networking unit (ONU) and a second cable modem associated with a second ONU in an RFoG network, wherein a transmission of the first ONU and a transmission of the second ONU overlapped in time;

recording a first set of cable modems, comprising at least the first cable modem and the second cable modem, on an OBI candidate list wherein the lost transmission event occurred when the transmission of the first ONU and the transmission of the second ONU overlapped in time; and implementing code in an upstream mapper to avoid scheduling contemporaneous transmissions from at least the two cable modems in the first set on the OBI candidate list within an OBI window, wherein the OBI window is a period of time available for contemporaneous transmissions by multiple devices;

wherein a pre-DOCSIS 3.0 cable modem included on the OBI candidate list is scheduled on a single frequency with other frequencies left strictly for modems not on the OBI candidate list, and wherein a DOCSIS 3.0 cable modem included on the OBI candidate list is scheduled to fragment its transmissions among upstream channels to maximize the data bandwidth and minimize the channel occupation time with any remaining channel bandwidth left strictly for other modems not on the OBI candidate list.

2. The method of claim 1, further comprising:
recording the time the first set of cable modems are recorded on the OBI candidate list, wherein the time is used to remove the first set of cable modems after a predetermined time interval has elapsed.

3. The method of claim 1, wherein the recording of a first set of cable modems includes a rate of lost transmissions by the modems in that first set that occur above a predefined threshold rate of lost transmission events.

4. The method of claim 2, wherein the recording of a first set of cable modems requires a number of lost transmissions above a predefined threshold of lost transmission events.

5. The method of claim 1, wherein the OBI window is longer than the longest upstream burst interval.

6. A method for scheduling the transmission of user devices on a RFoG network comprising:

determining whether a lost transmission event occurred between a first cable modem and second cable modem in an RFoG network, wherein the transmission of the first cable modem and the transmission of the second cable modem overlapped in time;

recording a first set of cable modems on an OBI candidate list;

implementing the upstream mapper algorithm so that at most one modem from the OBI candidate list is scheduled to transmit at any time, wherein scheduling of transmissions of the modems not on the OBI candidate list are not restricted;

wherein a pre-DOCSIS 3.0 cable modem included on the OBI candidate list is scheduled on a single frequency with other frequencies left strictly for modems not on the OBI candidate list, and wherein a DOCSIS 3.0 cable modem included on the OBI candidate list is scheduled to fragment its transmissions among upstream channels to maximize the data bandwidth and minimize the channel occupation time with any remaining channel bandwidth left strictly for other modems not on the OBI candidate list.

7. The method of claim 6, wherein the recording of a first cable modem set requires a rate of lost transmissions by the modems in that set above a predefined threshold rate of lost transmission events.

* * * * *